US006982966B2

(12) United States Patent
Eidenschink et al.

(10) Patent No.: US 6,982,966 B2
(45) Date of Patent: Jan. 3, 2006

(54) SATELLITE ROUTING PROTOCOL WITH DYNAMIC IP ADDRESSING

(75) Inventors: Thomas Eidenschink, Carlsbad, CA (US); Ariel Navarro, San Diego, CA (US); Luis Romero, San Diego, CA (US); Stacy Wile, Carlsbad, CA (US)

(73) Assignee: Viasat, Inc., Carlsbad, CA (US)

( * ) Notice: Subject to any disclaimer, the term of this patent is extended or adjusted under 35 U.S.C. 154(b) by 942 days.

(21) Appl. No.: 09/822,966

(22) Filed: Mar. 29, 2001

(65) Prior Publication Data

US 2001/0036161 A1   Nov. 1, 2001

Related U.S. Application Data

(60) Provisional application No. 60/196,054, filed on Apr. 10, 2000.

(51) Int. Cl.
  *H04B 7/212*  (2006.01)
(52) U.S. Cl. ..................................... 370/322; 370/400
(58) Field of Classification Search ................ 370/351, 370/341, 389, 392, 400, 315, 316, 319, 401, 370/322–326, 231, 232
  See application file for complete search history.

(56) References Cited

U.S. PATENT DOCUMENTS

| 5,968,129 | A | | 10/1999 | Dillon |
| 6,097,718 | A | * | 8/2000 | Bion ........................... 370/351 |
| 6,389,453 | B1 | * | 5/2002 | Willis ......................... 709/204 |
| 6,400,696 | B1 | * | 6/2002 | Hreha ......................... 370/316 |
| 6,625,170 | B1 | * | 9/2003 | Curry et al. ................. 370/467 |
| 6,693,879 | B1 | * | 2/2004 | Kawamura et al. ......... 370/235 |

* cited by examiner

*Primary Examiner*—Chau Nguyen
*Assistant Examiner*—Ian N. Moore
(74) *Attorney, Agent, or Firm*—Townsend and Townsend and Crew LLP

(57) ABSTRACT

A satellite routing protocol is provided in a packet switched mesh network environment (i.e., where user traffic is not routed through a single or central node) wherein all IP planning and routing in the global WAN network is provided through a central database management element and routing information is disseminated separately from the communication traffic via a bandwidth constricted control channel in communication with each node but typically set aside for other purposes (such as conventional DAMA control). Two specific approaches include a link state approach and a distance vector approach. The specific embodiments disclosed for the Satellite Routing Protocol (SRP) system according to the invention allows both fixed and mobile networks to connect directly to each other or to a gateway network via either a terrestrial LAN or a Demand Assigned Multiple Access (DAMA) WAN where there are links that are dynamically assignable.

17 Claims, 7 Drawing Sheets

SATELLITE ROUTING PROTOCOL WITH DYNAMIC IP ADDRESSING

BACKGROUND OF THE INVENTION

This invention relates to packet-switched communications via satellite links. A class of communication networks employ packet-switched routing. Typically, linking is established by local communication paths and local traffic management in which the traffic management mechanism is only in communication with those nodes through which traffic is actively passed. Traditional routing approaches are unable to discover routes to nodes for which there is no current active connection. In a demand assigned satellite network, a node may be directly connected to any other node, upon request, but may only be able to support a small number of connections at any time. A mechanism is needed for finding routes, and optimizing routing where dynamically changing links such as a demand assigned satellite link are in the path.

DEFINITIONS

The following defined terms are used herein.

General Definitions

Client/Server—A server is any computer that has some function requested by a number of other client computers. It is a basic assumption that servers have fixed IP addresses.

A single computer can handle a number of server functions. A computer can be a server for certain services and a client for other services.

Mobile network—The collection of processors, routers, servers and miscellaneous LAN equipment which are physically connected together to perform various data acquisition functions. A mobile network shares a common IP network (or subnet) address amongst its computing resources. Mobile networks, as the name implies, may change physical location and access other networks via standard terrestrial connections or via satellite.

Remote Terrestrial LAN—A LAN connecting mobile networks to other networks via terrestrial links.

VSAT LAN—A separate LAN connecting resources at a gateway site to the Gateway VSAT (Very Small Aperture Terminal) equipment.

Gateway WAN—The set of WAN connections which link the various local LANs to the VSAT LAN and to the Remote Terrestrial LAN.

IP Router—A device that routes IP (Internet Protocol) packets between interfaces based on the IP destination address.

Remote ST—A VSAT Subscriber Terminal (ST) located at remote locations. The remote ST is responsible for interfacing to telephony and IP devices at remote sites. The remote ST acts as an IP router, relaying IP packets between the LAN at the remote site and the satellite WAN.

Gateway ST—A VSAT Subscriber Terminal (ST) that terminates IP or voice traffic into the terrestrial network. The Gateway ST acts as an IP router, relaying IP packets between the VSAT LAN at the gateway and the satellite WAN. Consists of Local ST and integrated MAR.

Terrestrial Router—An IP router that relays IP packets between the VSAT or Remote Terrestrial LAN.

NCS—Network Control Station. The VSAT NCS controls a VSAT network, providing resource configuration, scheduling, and management functions to the network operator(s). Implements the network control system.

Server and Router Definitions (Fixed IP Address Assignment)

All of the following computing resources are considered servers or routers. These types of resources require pre-assigned, fixed IP addresses. Without this assumption, it would be difficult to manage applications in the IP network.

Application Server (AS)—Computer that runs applications specific to a local operation. These computers may be at mobile or fixed sites.

DNS (Domain Name Service) Server—Handles Domain Name resolution.

WINS Server—Handles Windows Named Services.

DHCP Server—Any computer running the DHCP service. May be located at fixed or mobile sites.

Mobile Boundary Router (MBR)—Any router connected between the Remote Terrestrial LAN or VSAT LAN and the rest of the network. The purpose of the MBR is to act as the interface between mobile network elements and the rest of the network. The MBR will also convert routing information received from the VSAT and Remote Terrestrial LANs into routing information for the rest of the network.

Mobile Area Router (MAR)—Any router located between the Remote Terrestrial and/or VSAT LAN and mobile networks. The purpose of the MAR is to advertise reachability to the mobile networks. All packets between the mobile and the gateway WAN network traverse through a MAR.

Client Workstations, Real-time Computers: Dynamic/non-global IP addressing

All of the following computing resources have dynamic IP addressing or non-unique IP addresses.

Client Computer (CC)—Computers that only run 'client' applications. These computers may obtain their addresses dynamically, or they may be statically defined. For dynamic addressing, they will use DHCP.

Subscriber Terminal (ST)—The VSAT nodes each have a unique address, as a member of the LAN to which they are connected.

IP and Routing Definitions

IP—Internet Protocol.

IP address—A 32-bit address, usually specified in 4 decimal numbers, separated by periods. For instance, 192.168.1.5 is a 32-bit IP address.

IP network—A full range of IP addresses, defined by the IP network address class. Any node with an IP address in the network range is a member of the IP network. Originally, IP addresses were divided into Class A, B, C, D, and E networks. These different classes defined the number of bits allocated to the 'network' portion, and the number of bits allocated to the 'host' portion. Class A networks have an 8-bit network portion, and a 24-bit host portion, Class B networks have 16/16, and Class C networks have 24/8.

IP subnet—To conserve the IP address space, IP networks were subdivided into subnetworks, or subnets, by using portions of the host field as a subnet field. A subnet mask is used to define how many bits are included in the IP subnet.

IP network prefix—The concepts of IP networks and subnets have been combined into a common term of a network prefix. A network prefix is that portion of an IP address which would be selected by a subnet mask whose most significant bits are ones and the rest are zeros. Network prefix will be used in this document instead of the older IP network and IP subnet terminology.

ICMP—Internet Control Message Protocol, an extension to the Internet Protocol (IP) defined by RFC 792. ICMP supports packets containing error, control, and informational messages.

RIPv2—Routing Information Protocol, version 2. A protocol defined by RFC 1058 that specifies how routers exchange routing table information. With RIP, routers periodically exchange their entire routing tables. RIPv2 can be used as the routing protocol between the gateway and-MBR in this context.

OSPF—Open Shortest Path First is a routing protocol developed for IP networks based on the shortest path first or link-state algorithm. OSPF version 2 is described in RFC 2328.

DHCP—Dynamic Host Configuration Protocol, a protocol for assigning dynamic IP addresses to devices on a network. With dynamic addressing, a device can have a different IP address every time it connects to the network.

Route Summarization—Process whereby a router accumulates a set of routes into a single route advertisement.

NAT—Network Address Translation, a function that converts host addresses in IP packets that traverse two networks. NAT is used to preserve IP addresses assigned to hosts, when those hosts addresses do not match the IP network prefix of the LAN for which this host resides.

DNS—Domain Name System (or Service), an Internet service that translates domain names into IP addresses.

WINS—Windows Internet Naming Service, a system that determines the IP address associated with a particular network computer. This is called name resolution. WINS supports network client and server computers running Windows and can provide name resolution for other computers with special arrangements.

DAMA—Demand Assigned Multiple Access, the process of automatically allocating communications resources (in this case satellite bandwidth and power) based on real-time demand.

DAMA IP—The VSAT function that automatically sets up and tears down links on demand, based on the contents of the IP packets that are being routed.

Scheduled IP—The VSAT function that sets up and tears down links on a schedule managed by the NCS.

Definitions Introduced According to the Invention

The following definitions are introduced at this point for convenience and represent new features in accordance with the invention.

SRP—Satellite Routing Protocol, a VSAT specific protocol for extending the IP routing information over a VSAT WAN, in order to permit mobility, and automatic network reconfiguration.

DAMA VSAT WAN—A WAN implemented via a satellite network using SRP.

RIN—Routing Information Notice message of a mobile Network, as relayed to an NCS by a remote ST over the DAMA control channel RIN Request—NCS message requesting RIN from an ST.

RIS—Routing Information Summary, an NCS message sent to STs indicating routing table update.

TRIN—Terrestrial Routing Information Notice, a message sent from an ST to indicate routes available to terrestrial networks.

TRIN Request—NCS message requesting TRIN from an ST.

TRIS—Terrestrial Routing Information Summary, a message sent from the NCS to STs to indicate terrestrial routing.

RR—Routing Request, a message sent from an ST to request routing information for a given IP packet.

RN—Routing Notice, a message sent from an ST in response to an RR, indicating that this ST can route a packet specified in the RR.

Limitations of Prior Art Terrestrial-oriented IP Routing Protocols

A routing protocol is needed to communicate between subscriber terminals (STs) in the Demand Assigned Multiple Access (DAMA) network. While the standard Internet routing protocol RIPv2 is adequate for use in the LAN environment, it has problems for use over the DAMA network. Some of these limitations will be discussed here, along with a discussion on working groups that are working on similar problems.

RIPv2 achieves stability by sending out routing packets every 30 seconds, regardless of whether any routing information has changed. This causes needless information to be sent between all DAMA sites participating in IP routing. RFC 1581 specifies changes that can be made to RIPv2 in support of demand circuits. Essentially, RIP routing packets are NOT sent between routers if the link between the routers is known to be good, and no routing information has changed. This is applicable to point-to-point WAN environments, not a DAMA WAN environment. It is actually desirable to get some notification from neighboring STs, to ensure the ST is online. However, this packet can be a 'hello' packet, and does not need to contain redundant routing information that is unchanged since the last update message.

RIPv2 advertises all routes it has learned from other attached interfaces. In our case, this means that RIPv2 running on the LAN can pick up IP routes that then need to be sent to all DAMA nodes in the network. Assume that there are 100 DAMA nodes, each possessing 10 routes each. This would require 1000 routing entries to be sent out every 30 seconds. 1000 DAMA nodes would require 10,000 routes every 30 seconds. Clearly, this approach will not scale well. One solution is to back off from the 30 second update rate, but that has the side effect of slowing down route convergence.

It is highly desirable to fit IP routing packets into small control messages. Minimizing the size of IP routing messages is needed to allow the system to scale.

Finally, certain centralized events require the VSAT subnets to be mobile. These mobile subnets will move around, and be very transitory. A given mobile network may be online for a day, a week, or longer. These changes must be communicated effectively via the DAMA network.

SUMMARY OF THE INVENTION

According to the invention, a satellite routing protocol is provided in a packet switched mesh network environment (i.e., where user traffic is not routed through a single or central node) wherein all IP planning and routing in the global WAN network is provided through a central database management element and routing information is disseminated separately from the communication traffic via a bandwidth constricted control channel in communication with each node but typically set aside for other purposes (such as conventional DAMA control). Two specific approaches include a link state approach and a distance vector approach. The specific embodiments disclosed for the Satellite Routing Protocol (SRP) system according to the invention allows both fixed and mobile networks to connect directly to each other or to a gateway network via either a terrestrial LAN or a Demand Assigned Multiple Access (DAMA) WAN where there are links that are dynamically assignable.

The following detailed description defines a representative Satellite Routing Protocol (SRP), which is a VSAT DAMA IP routing protocol. The invention will be better

DESCRIPTION OF THE SPECIFIC EMBODIMENTS

Network Diagram

Figure 1:
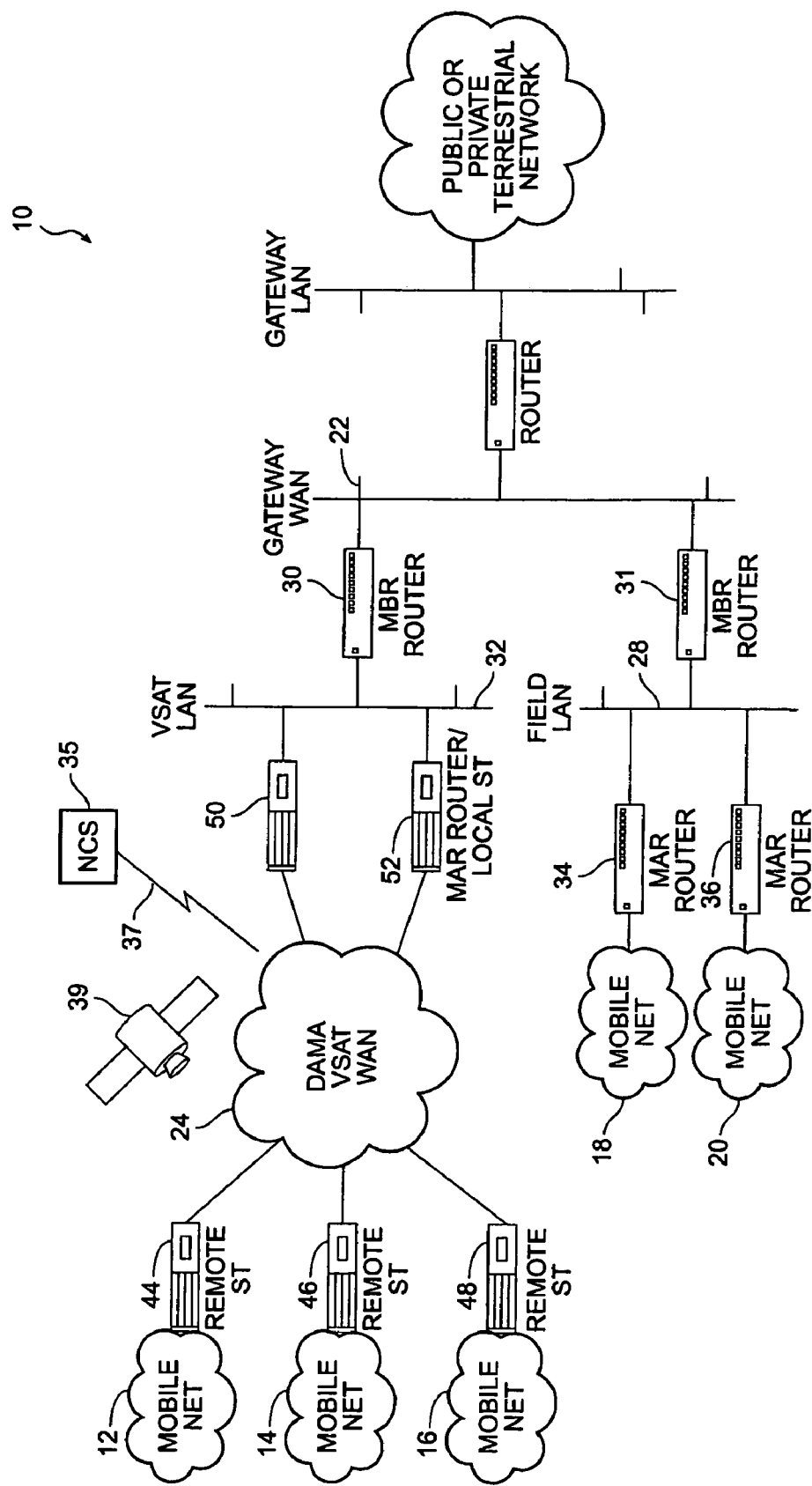
FIG. 1 is a diagram of the major components of the mobile network according to the invention.

FIG. 1 is a diagram of major components of a network environment 10 in which the present invention may be implemented.

Mobile networks 12, 14, 16, 18, 20 may be connected to a gateway WAN 22 network via a VSAT DAMA WAN 24 or a Remote Terrestrial LAN 26. The location of a given mobile network can change geographically, but the IP network prefix assigned will remain the same. DHCP and NAT services (not shown) may be used on the Mobile Nets 12, 14, 16, 18, 20 in order to support this mobile movement of computing resources. The use of these two services, and the IP routing involved, will be discussed hereinafter.

In accordance with the invention, a set of IP network prefixes is assigned to support networks reachable via the VSAT DAMA WAN 24. Additionally, a set of IP network prefixes is assigned for the Remote Terrestrial LANs 26. These networks are typically permanently assigned, so that a Mobile Boundary Router (MBR) at a VSAT LAN 32 and the MARs 34, 36 at the Remote Terrestrial LAN 26 are able to continually advertise those IP networks as reachable via their respective MBRs 30, 31. This minimizes routing changes propagated throughout the rest of the gateway WAN network 22.

The MBRs 30, 31 connect the VSAT LAN 32 and Remote Terrestrial LANs 26 to the rest of the gateway WAN network 22. MBRs advertise routing information into another network typically using OSPF or other protocol. MBRs translate routing information, such as RIPv2 and OSPF routing information, and can import from one area to another, such as the RIPv2 routing information into the OSPF area.

Computing resources that connect to the mobile environment have IP addresses predefined, or assigned via DHCP. Three cases of IP addressing are possible, but the result must be that IP packets originated by a mobile computing device MUST have a valid VSAT or Remote Terrestrial IP network prefix. The three cases, called Types 1 through 3, are discussed here briefly.

Type 1 computing resource will run DHCP and obtain its IP address from a DHCP server. The DHCP server will allocate IP addresses that are consistent with the IP network prefix assigned for this particular LAN.

Type 2 computing resources are pre-assigned an IP address that is consistent with the IP network prefix assigned for this particular LAN. This may occur to support the current environment, or to support servers (such as the DHCP server) that need to have a predefined IP address.

Type 3 computing resources are pre-assigned an IP address that is not consistent with the IP network prefix assigned for this particular LAN. This will occur if 'legacy' equipment needs to be used at a site, and the IP address can not be easily changed (or DHCP enabled). In this case, NAT will be used to translate a legacy address to a correct VSAT or Remote Terrestrial LAN IP address. NAT will run on routers installed at the Remote Terrestrial location, and at remote sites that need to support legacy equipment.

In accordance with the invention, an enhanced network control system (NCS) 35 is provided in conjunction with the VSAT DAMA WAN 24 to manage the satellite resources to maximize traffic throughput and other operations in accordance with the protocol of the invention. The NCS employs the bandwidth constricted control channel 36 of the conventional DAMA protocol to communicate control information via the relay satellite 39 to all resources monitoring the control channel. The resources include all STs having active traffic or which can receive signals, whether or not currently active. (It is assumed that STs can only communicate with each other via a DAMA WAN when they can mutually receive signals from the DAMA NCS controller 35 over the satellite 39.)

Figure 2:
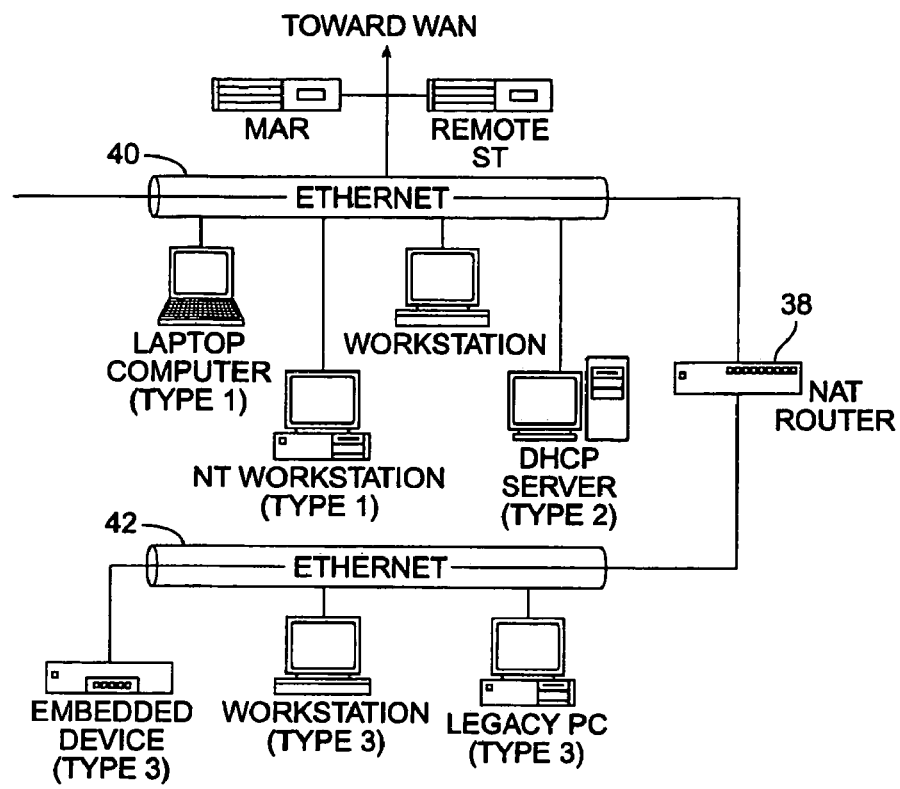
FIG. 2 is a diagram showing various device types and a router.

Referring to FIG. 2, there is shown a diagram of a typical mobile net having a NAT router 38. NAT routers 38 have two LAN interfaces 40, 42. Type 1 devices and Type 2 devices connect to the primary LAN interface 40, while Type 3 devices connect to the secondary LAN interface 42. The primary LAN interface 40 connects via an MAR router 34,36 (FIG. 1 or 2) to the remote terrestrial LAN 26 or via a remote Subscriber Terminal (ST) 44, 46 or 48 (FIG. 1) and thence via the VSAT DAMA WAN 24 and a further remote ST/MAR router 50 or 52 to the VSAT LAN 32.

Supporting both NAT and DHCP services allows central controllers (not shown) to transition their mobile computing resources as time permits. Also, resources may be deployed dynamically at any remote VSAT location, or connected to a LAN at any Remote Terrestrial location. The user simply needs to connect to the proper LAN (NAT or DHCP LAN) so that access to the gateway WAN network 22 is enabled.

Mobile Network Operations

The remote STs 44, 46, 48 are responsible for providing connectivity for their own mobile networks 12, 14, 16 to any of the other network resources such as the rest of the gateway WAN network 22, as for example via the VSAT DAMA WAN 24 and the VSAT LAN 32. The remote STs typically obtain their IP address (and associated subnet mask) from a DHCP server. Upon obtaining their unique IP addresses, the remote STs are operative to advertise that their portion of the IP network available at their respective mobile network sites, using the Satellite Routing Protocol according to the invention.

The typical remote ST 12 executes a portion of the SRP in communication with the NCS 35. Once online, the remote ST sets up and tears down DAMA IP links based on its local application demand, as described hereinafter. Additionally, the NCS 35 may initiate IP links based on a schedule developed around reservations inputted by the system human operator. IP links also may be initiated by local STs 50, 52 based on local demand.

Remote Terrestrial LAN

The Field LAN or Remote Terrestrial LAN 26 may have a single router or many routers. This is determined by the number of LAN ports desired at the Remote Terrestrial LAN and the type of router chosen for centralized control, such as MBR router 31. It is the responsibility of the system deployer having centralized control to determine the needs of the Remote Terrestrial LAN 26.

VSAT Gateway Operations

Figure 3:
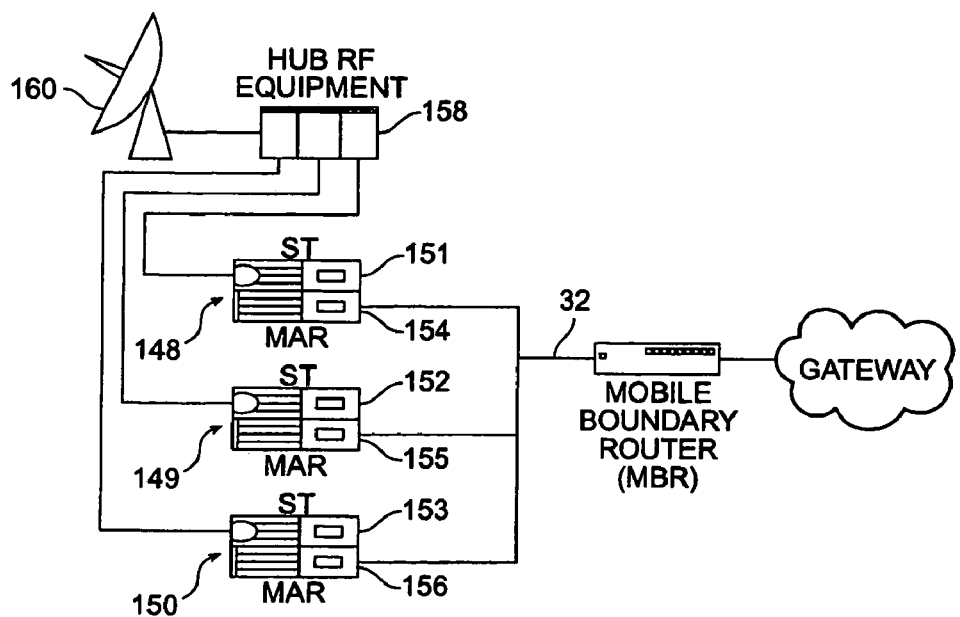
FIG. 3 illustrates a configuration of VSAT units.

VSAT Gateway equipment is used to access all mobile networks of the system 10 that use the VSAT DAMA WAN 24. Referring to FIG. 3, the VSAT Gateway equipment typically includes VSAT units 148-150 (typically racked together) connected to the VSAT LAN 32. The STs 148-150 are coupled through hub RF equipment 158 to the satellite antenna.

The VSAT units shown in FIG. 3 serve two functions. One is to provide access to the mobile networks over the VSAT WAN. Modem resources resident within the VSAT equipment are dynamically allocated as needed to serve the bandwidth requirements of each mobile network. Second, the VSAT units perform the MAR function, advertising reachability to the greater network environment 10 connected to the VSAT LAN 32, typically through the MBRs 30, 31.

In order to efficiently use all available resources at the gateway, the satellite modems are logically grouped into pools at the NCS 35. When a given mobile network 12, 14, 16 requires IP connectivity over the DAMA WAN to another network, the NCS simply assigns an appropriate available DAMA modem from any of the VSATs located at the gateway.

IP Routing

Figure 4:
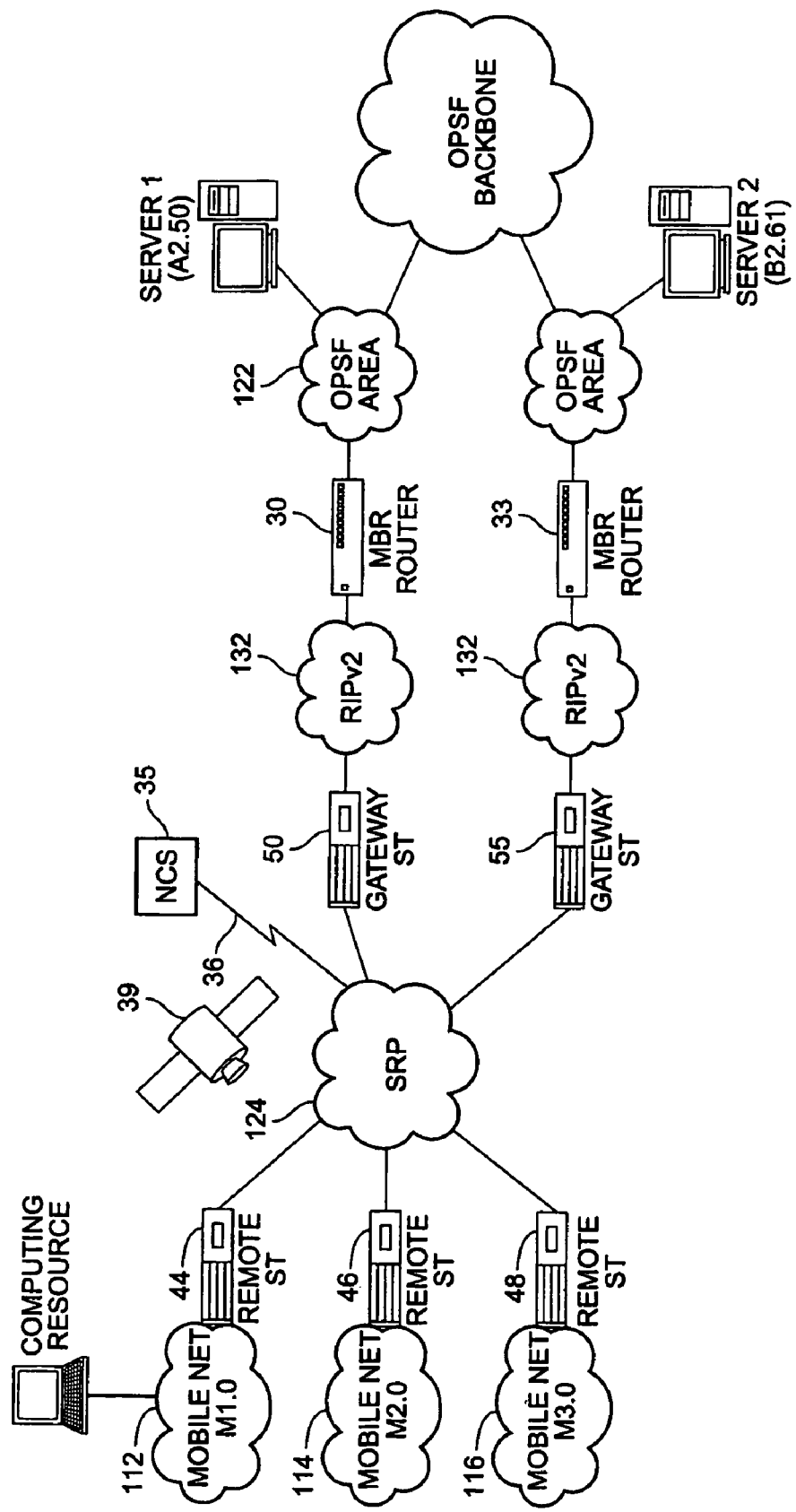
FIG. 4 depicts IP routing protocols according to the invention, together with the equipment that participates in forwarding IP packets between computing resources.

FIG. 4 depicts IP routing protocols involved with the Satellite Routing Protocol 124 in a typical embodiment according to the invention, as well as the equipment that participates in forwarding IP packets between computing resources. The protocols are depicted as "clouds" between elements of the system 10. It is to be noted that packets that traverse over the DAMA network are routed, not bridged.

The gateway WAN network is based on OSPF 122 and may contain over 100 routers. The network may easily span multiple countries and contain a number of geographic areas.

The SRP protocol 124 ties into the OSPF protocol network at gateway sites 50, 55, comprising what is called local STs with MAR routers wherein the MAR routers service the interface of the SRP protocol with other protocols (FIG. 1). Although only one gateway ST is shown at a single site in FIG. 4, there are generally a number of gateway STs connected to a single MBR 30 or 33 at a given gateway site, as shown in FIG. 1. The protocol used between the Gateway STs 50 or 55 and the MBR 30 or 33 is typically RIPv2 132.

RIPv2 132 or other appropriate gateway-MBR protocol serves two main functions. The first function is to advertise the IP network prefixes currently active at the mobile sites. As remote STs enter and leave the DAMA network, these changes are typically communicated via RIPv2. They will in turn allow the MBR 30 or 33 to determine whether to route packets from the OSPF protocol-based network into the gateway-MBR-based network, or whether to generate an ICMP message back to the source, signifying that the targeted network is "unreachable."

The second function of the gateway-MBR protocol 132 such as RIPv2 is to route packets to the appropriate gateway ST 50 or 55. As IP links are activated and terminated between gateway STs and remote STs 44, 46, 48, the gateway-MBR protocol 132 (RIPv2) is used to "steer" the IP packets from the MBR to the appropriate gateway ST that has the active links. There are generally more remote STs than modem resources available at the gateway STs 50, 52. Therefore the choice of which gateway ST is used to connect to a given remote ST can change over time. The gateway-MBR protocol metrics may be used to ensure the MBR picks a "best path," in accordance with the invention to the remote IP network prefix location.

Figure 8:
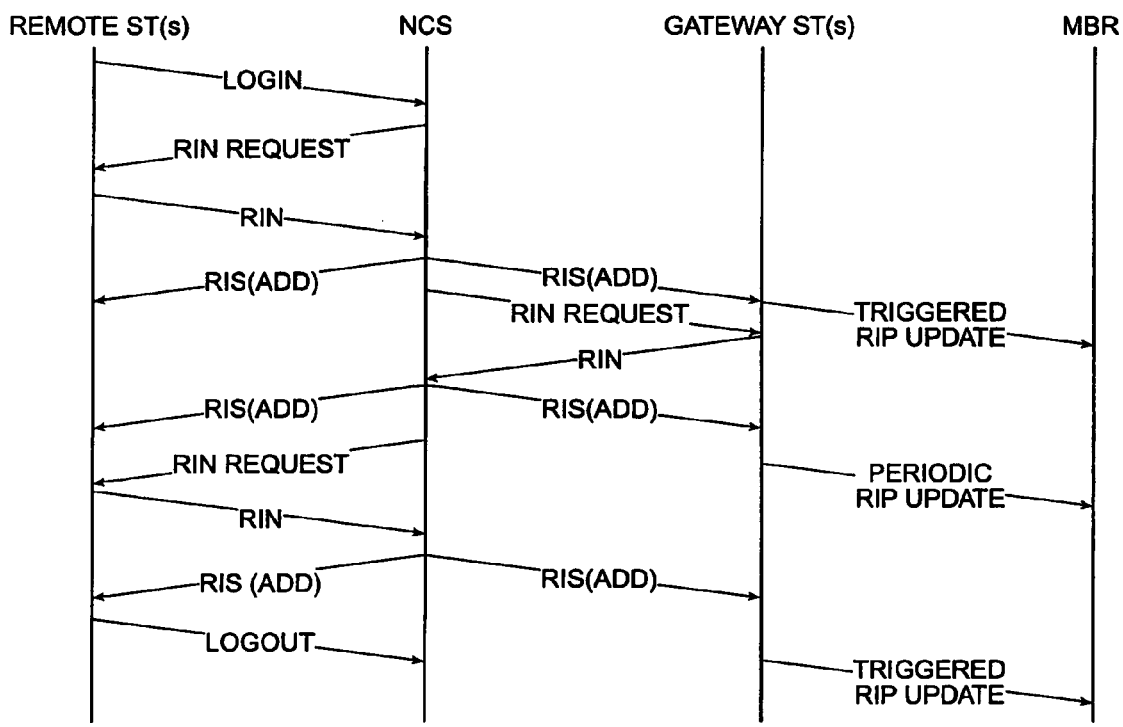
FIG. 8 shows the process of normal ST network entry and exit using a distance vector approach.
Figure 9:
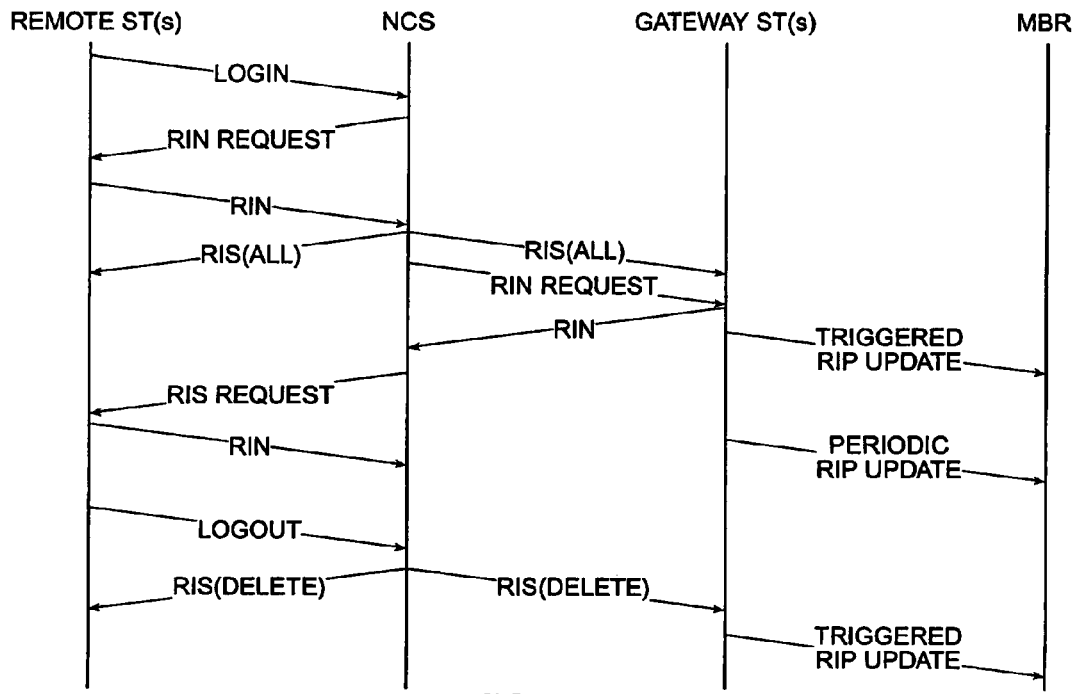
FIG. 9 shows the process of normal ST network entry and exit using link state approach.

According to invention, there are two approaches to the implementation of the inventive SRP as a DAMA-based routing protocol, as depicted in FIGS. 8 and 9. These are the distance vector approach and the link state approach. In both cases, the main function of SRP is to advertise the IP network prefix of the LANs directly connected to the STs. In the previous network diagram, this would consist of mobile networks such as M1.0, M2.0, and so on. Additionally, the IP network prefix of any gateway locations is also advertised by SRP.

Figure 5:
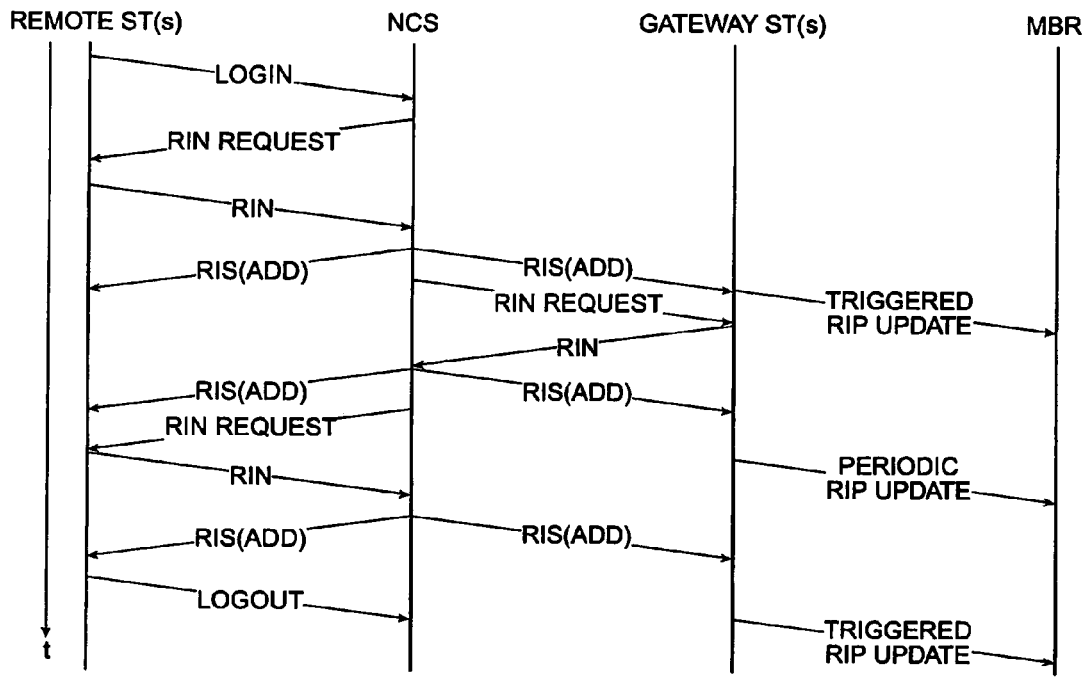
FIG. 5 depicts the interaction between the components in the system.

Because the SRP has a compact and efficient messaging scheme, as described herein, SRP operates over existing control channels present in a DAMA network. Therefore, SRP does not require additional modems or additional modem modes in order to operate, which is a distinct advantage according to the invention. FIG. 5 depicts the interaction between the components in the system. It is a timeline serving as an overview of system operation. The messages of SRP according to the invention are depicted by labeled vectors between the nodes as listed at the top of the figure, and time is a vertical axis. This diagram is in accordance with accepted industry descriptive documentation practices and requires no further explanation to those of ordinary skill in the art.

The protocol includes a Remote ST Login, which is an ST login that causes initial routing information to be sent to the NCS upon initiation of the remote network. The login information is forwarded to all STs in the network. Gateway STs intercept and interpret this information and perform a RIP routing update message, including the new IP network now reachable via this new remote ST. The NCS also stores the IP network prefix for this remote ST. This is used by the NCS later when performing "next hop" resolution.

During normal operation, there are periodic SRP updates where the NCS periodically polls each ST for basic routing information via the RIN request message. As required, this routing information is sent to the rest of the STs in the network.

Remote ST Logout is also provided. The ST may log out due to operator action at the ST. This logout event will eventually cause gateway STs to timeout and stop advertising the IP network prefix associated with the remote ST that logged out.

Remote mobile network sites are considered "stub" networks, that is, no routing protocols are run at the remote locations. The LANs 12, 14, 16 of FIG. 1 are each simple, single IP network prefix networks, and the protocols 112, 114, 116 of FIG. 4 do not contain routing features.

As discussed previously, it is possible that legacy devices may exist whose IP network prefix does not match the IP network prefix of the remote ST. These devices would not be able to access the Gateway WAN network but for this invention, since their packets would not be routed. To solve this problem, a Network Address Translation (NAT) device 38 (FIG. 2) converts the legacy addresses into the proper IP network prefix, allowing the packets to be routed.

DAMA IP

When an IP packet is transmitted by a network node, it traverses the IP network one hop at a time until it arrives at its ultimate destination. Devices that forward IP packets are called routers or switches. The VSAT STs operate as SRP routers. When an ST receives an IP packet, it first validates if this packet can be routed. If not, the packet is dropped and an ICMP "unreachable" message is sent back to the source.

Figure 6:
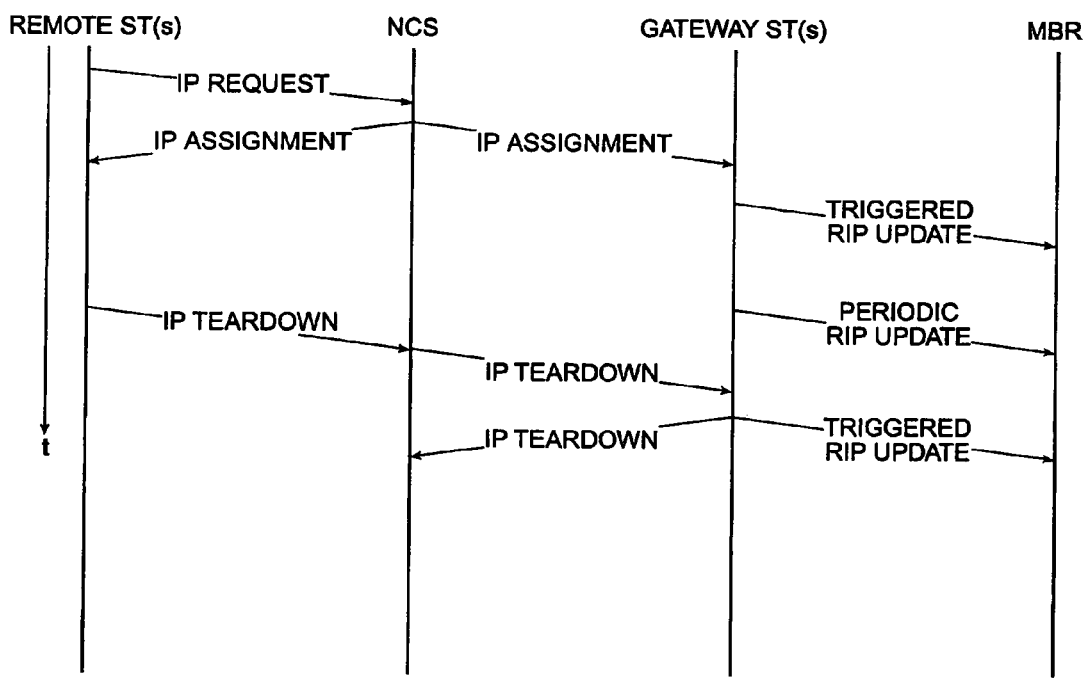
FIG. 6 shows the process that occurs when an IP circuit is brought up.

FIG. 6 shows the process that occurs when an IP circuit is brought up in the SRP using the NCS.

First is the IP request. This occurs when the Remote ST receives an IP packet whose destination address matches a route entry in this ST's routing database. An IP request is sent with the next hop address determined from the STs local routing table to the NCS for processing.

Second is the IP Assignment when the NCS reviews the next hop address contained in the request to determine the possible destination STs that may be used to terminate this request. The NCS compares the IP network prefix sent in the IP request to the IP network prefix assigned to the STs that are logged into the network. If the IP network prefix is found, the NCS selects an available modem to satisfy the request, which selection is embedded in the IP Assignment message. Note that local STs in the same gateway share the same IP network prefix, and the NCS automatically puts these STs into a "pool" of resources to select from for that given IP network prefix.

If modem resources are available, the NCS then checks for available bandwidth and power to meet the needs specified in the IP request. If adequate resources are available, the NCS sends out the IP Assignment message (a control message) to the remote ST and to the Gateway ST assigned to service this remote ST for this IP request.

The MAR portion of the Gateway ST assigned to service this IP network thereafter sends out RIP packets with a metric that causes the MBR to route packets to this requesting ST, instead of one of the other STs in its pool. Traffic packets are then sent over the DAMA IP traffic link described in the IP Assignment message to the targeted remote ST. Packets sent by computing resources at the remote ST site use the DAMA IP traffic link to transmit data to the gateway ST, which forwards the IP packets to the MBR.

A Periodic RIP Update occurs when the Gateway ST continues to advertise reachability to the specific IP network prefix at a periodic interval.

IP Teardown occurs at some point when the activity timer triggers the IP traffic link to be torn down. Either the remote ST or the Gateway ST initiates this activity. The result is that the modem, satellite bandwidth, and satellite power resources are freed up, and the Gateway ST advertises a metric consistent with the other STs in its pool, thus stopping advertising that this is the preferred path to the IP network that was best reachable via the active DAMA IP traffic link.

Other Scenarios

Other scenarios are not specifically illustrated.

1) Gateway ST initiates request. This scenario would show the initial IP request event originating from the gateway ST. The remainder of the data flow is the same.

2) Remote ST to Remote ST. This scenario would involve no RIP updates, since RIP is not run at remote locations.

Scheduled IP

Figure 7:
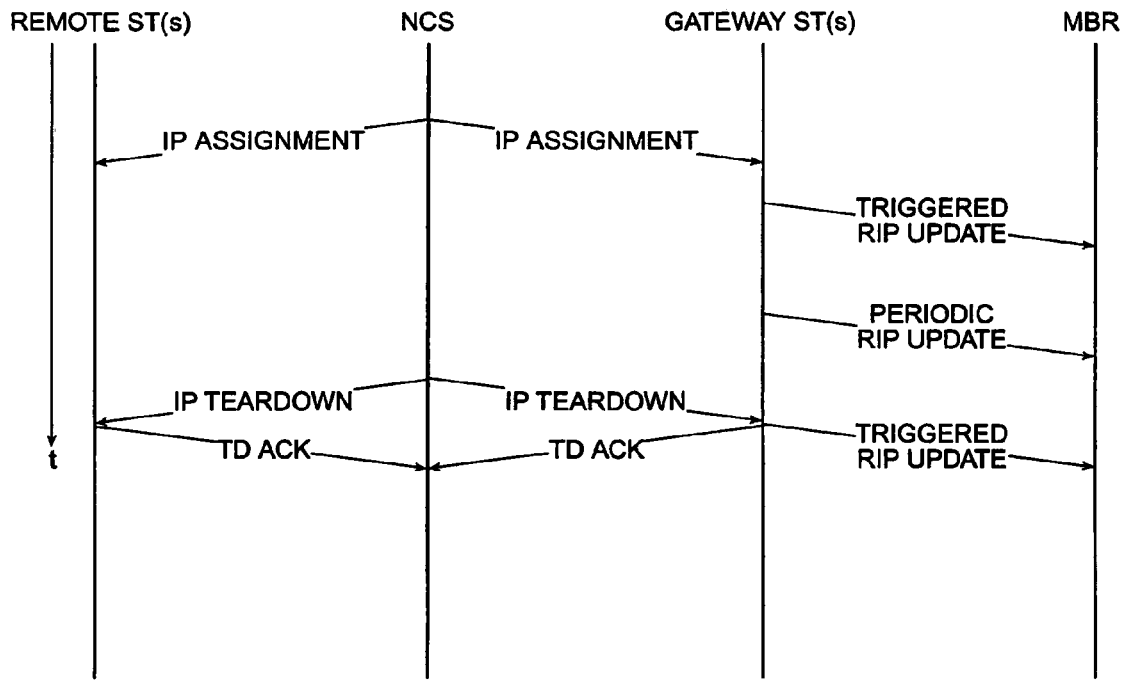
FIG. 7 shows the process that occurs when an IP circuit is brought up via the NCS scheduler.

FIG. 7 shows the process that occurs when an IP circuit is brought up via the NCS scheduler. The NCS initiates IP circuits per the schedule defined by the operator. If modem resources are available, the NCS then checks for available bandwidth and power to meet the needs specified in the IP request. If adequate resources are available, the NCS sends out the IP Assignment to the remote ST, and to the gateway ST assigned to service this remote ST.

The Gateway ST assigned to service this IP network sends out RIP packets with a metric that will cause the MBR to route packets to this ST instead of any other ST in its pool. These packets are then sent over the DAMA IP traffic link to the specifically addressed remote ST. Packets sent by computing resources at the remote ST site use the DAMA IP traffic link to transmit data to the Gateway ST, which forwards the IP packets to the MBR. The Gateway ST continues to advertise reachability to the specific IP network prefix at a periodic interval. This is again a Periodic RIP Update.

The NCS terminates the IP traffic link at the time defined in the schedule via the IP Teardown message. The result is that the modem, satellite bandwidth, and satellite power resources are freed up, and the Gateway ST stops advertising that this is the preferred path to the IP network that was best reachable via the active DAMA IP traffic link.

The Satellite Routing Protocol (SRP) according to the invention has three main functions. The primary function of the SRP is to build the network map of all directly connected IP network prefixes reachable via the DAMA WAN. Each ST advertises the IP network prefix of its LAN using the Routing Information Notice (RIN). The NCS is responsible for polling each ST for its RIN at a periodic rate. The NCS uses this information to send out Routing Information Summaries (RIS) to the rest of the STs in the network. RINs are used to keep all STs aware of the other STs connected to the DAMA network, together with their directly-connected network prefixes. If route summarization is being used on the network, this route summary information is also disseminated via RIN/RIS messages. Part of the construction of the network map is route summarization. Route summarization, the process whereby a router accumulates a set of routes into a single route advertisement, can be done when a number of IP subnets reachable by a given router are contiguous and span across an area that can be defined by an IP subnet mask. For instance, suppose a standard class C network, 199.106.52.0, was partitioned into four subnets. This would be 199.106.52.0, 199.106.52.64, 199.106.52.128, and 199.106.52.192. If a router can reach each of these subnets but does not support route summarization, it would have to advertise four separate routes. Each of these routes would carry the IP subnet address, and a 26 bit subnet mask. With route summarization according to the invention, a single route would be advertised, 199.106.52.0, with a 24 bit subnet mask.

A second function of the SRP according to the invention is to allow specific STs to advertise routing information beyond that of its directly-connected network. For instance, if an ST is running RIPv2 and learns of routes available via other routers, this routes available information is forwarded to other STs using the SRP according to the invention. The STs send this additional routing information to the NCS using the Terrestrial Routing Information Notice TRIN. The NCS then uses this information to generate Terrestrial Routing Information Summary TRIS, which is sent to all STs in the network.

A third function of the SRP according to the invention is to probe for other IP network prefixes reachable via the DAMA network. It uses a query/response process as follows. The process is initiated when an ST, herein a requesting ST, receives an IP packet that cannot be routed directly, but which matches the 'supernet' defined for one of the other STs in the network. The requesting ST then generates a Route Request (RR) message, which is sent to all STs in the DAMA network. The RR message contains the IP destination address from the IP packet that the requesting ST is trying to route, prompting each ST to search its routing table to determine if it can route the IP packet as desired. If so, the routing capable ST sends a Route Notice (RN) message back to the requesting ST. The requesting ST then enters a route for this IP subnet, triggering a DAMA IP link request to the target ST.

SRP according to the invention supports route summarization, and it is used in two ways. The first use is to support the standard use of route summarization, that is, to minimize the number of routes that must be advertised. SRP supports this inherently by sending the IP network prefix address, along with an associated subnet mask. The second use is to support proper operation of the route query process.

To understand the route query process, a brief discussion of the operation of routing must be described. When an IP packet is received by a router, it determines first whether the packet is destined for itself. If so, the packet is sent up to a higher layer protocol, such as TCP or UDP. If the packet is not destined for the router, then an attempt is made at forwarding the packet out one of the router's interfaces. The router checks its route table to determine if this IP packet is forwarded, using the destination IP address contained in the IP packet.

The router attempts to make the 'best' match for the destination address. The rules it uses are reasonably standard as follows.

1) First, check if there is a host route that matches the full 32-bit address of the destination IP address. If a match is found, route the packet to the next hop defined for the host route.

2) If the host route check fails, determine if this IP address is subnetted. If so, search the route table looking for a match to the most qualified subnet address. If a match is found, route the packet to the next hop defined for the IP subnet route.

3) If the subnet check fails, use the default IP network portion based on the Class A, B, C address for this packet, and look for a route in the table. If a match is found, route it.

4) If all these checks fail, look for a default entry. 0.0.0.0. If a default entry exists, route the packet to the next hop defined for the default entry.

The route query process of SRP according to the invention can now be explained. It will be discovered that a default gateway entry can wreak havoc. If a default gateway entry exists, that path will be taken when a route fails tests 1-3 above, so the SRP query process will not occur.

One possible solution based on prior art is to run the SRP query process between Steps 3 and 4 above. For example, before using the default gateway, try to resolve the address using the SRP query process. If this fails, then use the default gateway. This would work, but has the potential to generate a sizable amount of SRP queries if the DAMA network is connected to a large IP network, be it the Internet or a large Intranet.

The SRP according to the invention handles this potential traffic overload condition through a supernet concept. A supernet is a set of IP network prefixes that are close to each other in terms of prefix in the address space, although they need not be contiguous. The network designer configures each IP router with the scope of the search that should be done from the address information known by this node. So, if this node is aware of 192.168.1.64, subnet mask 26 bits, and the supernet is set to 24 bits, then this node will try to resolve addresses of 192.168.1.0 using the route query process. If the supernet is set to 16 bits, then this node would try to resolve addresses from 192.168.0.0 to 192.168.255.255. Note that this spans a number of Class C networks.

Specific Embodiments of SRP

The SRP according to the invention supports the primary function of building the network map of all directly connected IP network prefixes reachable via the DAMA WAN. Two approaches are provided as examples.

Distance-Vector Approach

Figure 10:
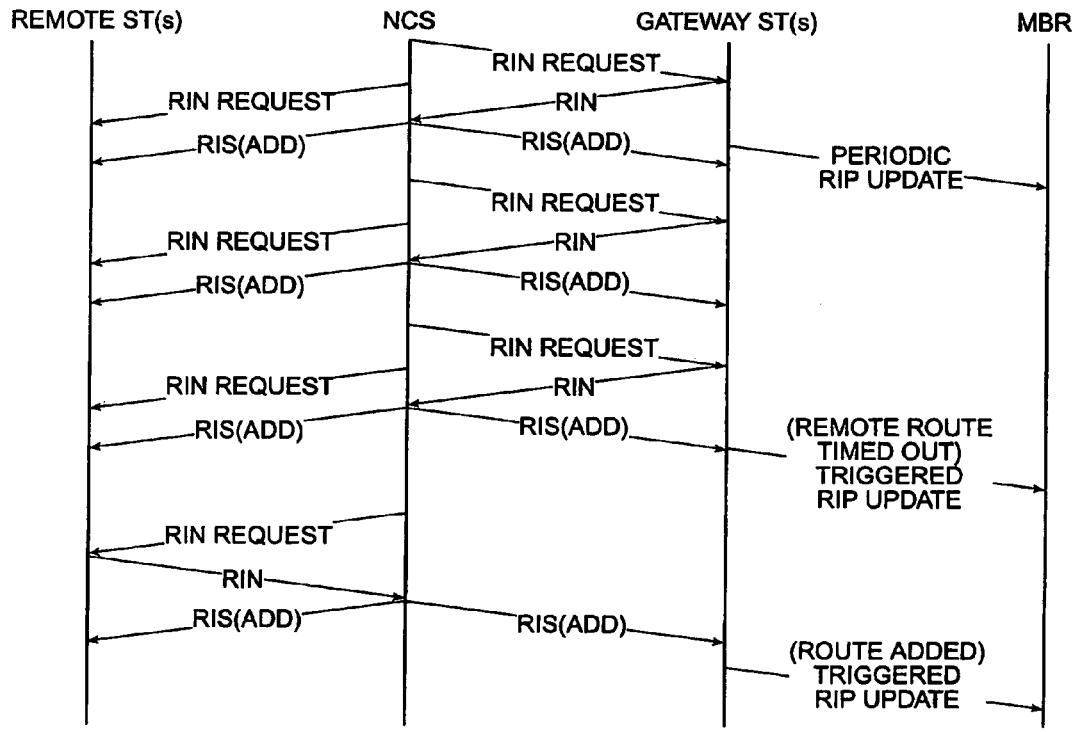
FIG. 10 shows the process that occurs when the NCS loses and regains communication with an ST using a distance vector approach.

Referring to FIG. 8 and FIG. 10, in a Distance Vector Approach, routing information is sent at a periodic rate, regardless of whether the routing information has changed. Each ST transmits its basic routing information at this periodic rate, and receives basic routing information from all other STs at this periodic rate. The NCS acts as the repeater, transmitting every routing message it receives. Each ST is responsible for maintaining its own route table, adding routes not already in its table, refreshing routes already in the table, and deleting routes if no update has been received after a timeout period. This approach has the following advantages and disadvantages.

Advantages

1) Simple. Allows for fast high-level design effort.
2) Similar to RIPv2. Can reuse existing RIP software.
3) Ease of Integration. NCS/ST interaction minimal.

Disadvantages

1) Wastes control channel bandwidth.
2) Does not easily scale to large networks.

Link State Approach

Figure 11:
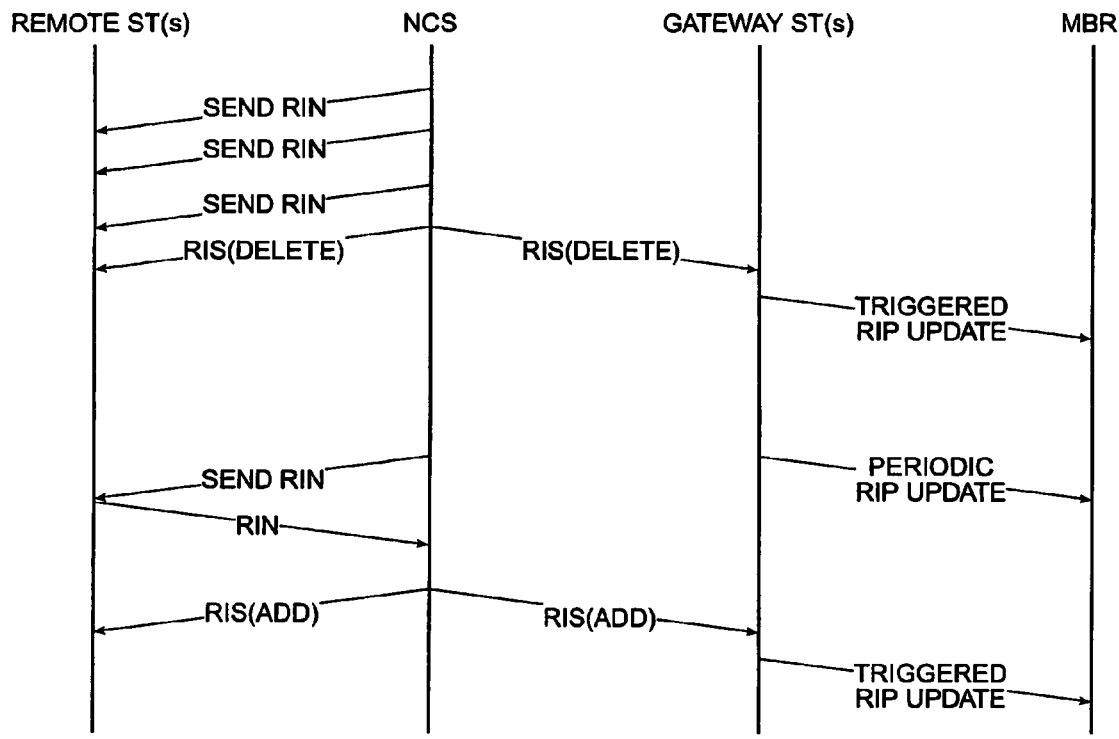
FIG. 11 shows the process that occurs when the NCS loses and regains communication with an ST using a link state approach.

Referring to FIG. 9 and FIG. 11, in a Link State Approach, a single router, called the designated router (DR) keeps a complete routing database of the area. The DR is responsible for updating routers within the area as routes are added/deleted and routers are added/deleted.

In one embodiment of the present invention, the NCS serves as the DR. As the NCS polls individual STs, it updates a master route database and broadcasts changes to that database to STs. The NCS will become aware of route database mismatches by polling the STs for their route database checksums. It can rebroadcast the entire route database if a mismatch occurs, or have algorithms that checkpoint the database, allowing for incremental updates. This approach has the following advantages and disadvantages.

Advantages

1) Scales well for larger networks.

2) Efficiently uses control channel bandwidth.

3) Algorithm can support extended routing information.

Disadvantages

1) More complex design.

Scenarios

Remote ST Online/Offline Transition—Distance Vector Approach

Referring to FIG. 8, as remote STs log in and log out of the network, IP network reachability changes must be communicated to the MBR. Note that in this approach the NCS only sends RIS (add) messages. No RIS (delete) or RIS (summary) messages are sent.

Remote ST Login—The NCS adds this ST to the NCS poll list.

RIN Request—The NCS polls the newly added ST for basic routing information.

RIN—The ST sends information regarding its directly connected network.

RIS (add)—The NCS updates its route table and broadcasts only the polled STs information to the entire network.

Triggered RIP Update—If a gateway ST senses this is a new route, it adds the route to its table and which triggers a RIP update. If the route is already in the table a RIP update is not triggered.

RIN Request—The NCS continues polling other nodes in the network, and broadcasting their responses.

ST Logout—When an ST logs out, the NCS deletes the ST from its polling list. No further RIN requests are sent to this ST->No RINs are sent from this ST->No further RIS (adds) are broadcast for this ST's routes. Eventually, the route associated with the logged out ST is deleted because it does not get refreshed.

Triggered RIP Update—If a gateway ST running RIPv2 deletes this route, a RIP update is triggered (on the terrestrial side of the gateway ST).

Remote ST Online/Offline Transition—Link State Approach

Referring to FIG. 9, as remote STs login and logout of the network, IP network reachability changes must be communicated to the MBR.

Remote ST Login—The ST is added to the NCS poll list.

RIN messages—The NCS periodically polls each ST for basic routing information. When a ST enters the network, it has no routing information. The NCS detects this when the route database checksum in the RIN message does not match the checksum the NCS has. This causes the NCS to broadcast the entire routing information database RIS (all)—The NCS sends out the entire routing information database. This may include multiple messages spread out amongst multiple transmissions. The RIS has a field that informs STs whether this message includes the first, middle, or last block of the routing information database. All STs shall replace their databases with the information from the NCS at this time.

RIN messages—After the network converges to know about the new ST, future RIN poll/responses generate no RIS traffic.

ST Logout—When an ST logs out, the NCS sends out a RIS that instructs all STs to delete routing information pertaining to the ST that just logged out.

Loss of Communication with Remote ST—Distance Vector Approach

Referring to FIG. 10, the NCS periodically polls STs for basic routing information. If the ST does not respond, this causes a routing update to occur.

RIN Request—The NCS polls each ST for RIN messages. If a ST fails to respond to the polls, the NCS will delete the routing information for this ST, and continue polling the next node. Since the RIN Request was unanswered, the NCS will not broadcast a RIS (add) message for this node. Eventually, other STs will drop this route from their table if they do not receive a RIS (add) message within a route timeout interval.

Triggered RIP Update—If a route timeout occurs on a gateway ST running RIPv2, a RIP update will be triggered.

RIN Request/RIN—If the non-responsive ST replies to a later RIN Request, the NCS adds the route back to its route table and broadcasts a RIS (add).

Triggered RIP Update—If a gateway ST previously deleted because of a route timeout, the gateway ST will add the route, and send a RIP update. If the route had not been deleted, its route timeout is simply refreshed (and no triggered RIP update is broadcast).

Loss of Communication with Remote ST—Link State Approach

Referring to FIG. 11, the NCS periodically polls STs for basic routing information. If the ST does not respond, this causes a routing update to occur.

Send RIN—The NCS polls each ST for RIN messages. If a ST fails to respond to three consecutive poll, the NCS deletes the routing information for this ST.

RIS (delete)—The NCS sends out a RIS specifying the routes that should be deleted from all ST databases.

RIN response—If the ST later responds to a poll from the NCS (and didn't go through the login/logout cycle), the NCS will add the routing information for this ST.

RIS(add)—The NCS send out a RIS specifying the routes that should be added to all ST databases.

Triggered RIP updates—Any changes to the routing information at Gateway STs cause RIP updates to be sent immediately.

Checksum Does Not Match—Link State Approach Only

Figure 12:
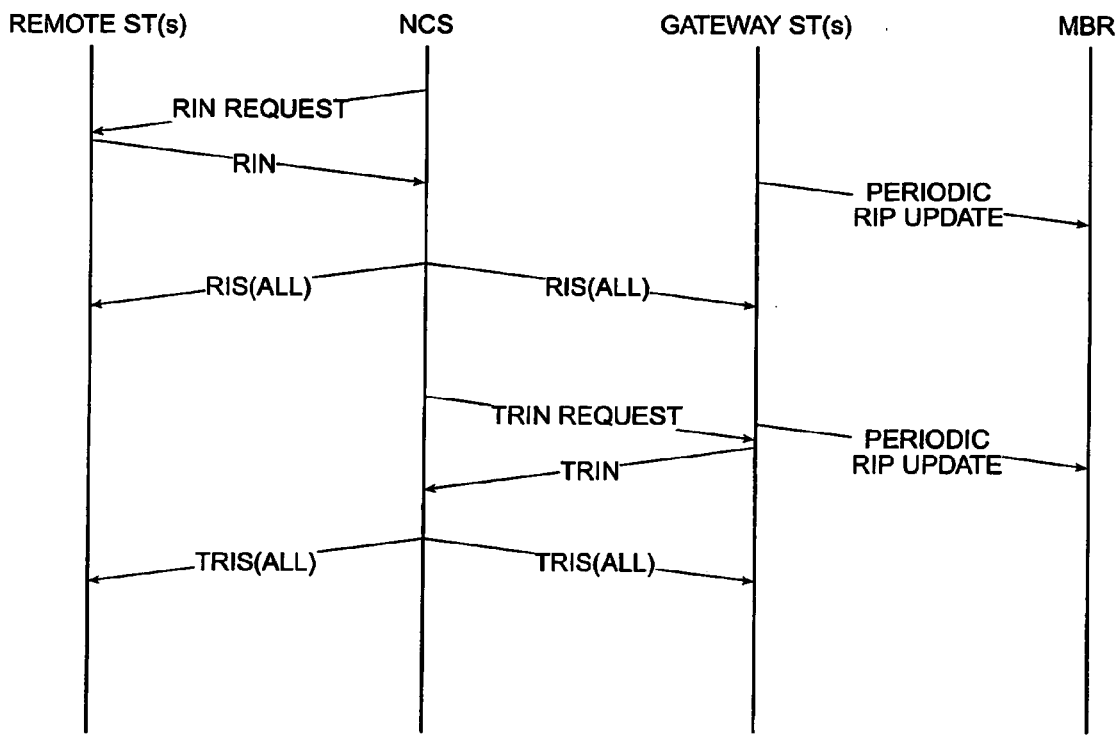
FIG. 12 shows the process that occurs when there is a checksum mismatch using the link state approach.

Referring to FIG. 12, the NCS retrieves the ST's routing information and routing information database checksums from the RIN poll. If either checksum does not agree with the NCS's, then the ST needs an update. This is not used in the Distance Vector Approach because the Distance Vector Approach does not use checksums RIN—The NCS polls the ST for routing information. It notes that the routing information database checksum does not agree with the NCS value. This triggers the NCS to broadcast the routing information database.

RIS(all)—The NCS sends out the routing information database to all STs.

TRIN—The NCS polls the ST for routing information. It notes that the routing information database checksum does not agree with the NCS value. This triggers the NCS to broadcast the routing information database.

TRIS(all)—The NCS sends out the routing information database to all STs.

The invention has been explained with reference to specific embodiments. Other embodiments will be evident to those of ordinary skill in the art. It is therefore not intended for this invention to be limited except as indicated by the appended claims.

What is claimed is:

1. A method for establishing routing of communications via a satellite for an IP-based Demand Assigned Multiple Access (DAMA) Wide Area Network (WAN), said DAMA WAN being characterized by a bandwidth constricted control channel under control of a centralized Network Control Station for communication of channel allocation and routing information to each node in said DAMA WAN, said method comprising:

constructing a network map of all directly and indirectly connected IP network prefixes reachable via said DAMA WAN; and allocating at said Network Control Station (NCS), DAMA WAN type communication channels via said satellite by a control channel message over said bandwidth constricted control channel directed to each involved subscriber terminal (ST) node connected to said WAN.

2. The method according to claim 1 further including the step of:

periodically transmitting routing information whether or not said routing information has changed in order to invoke a distance vector protocol.

3. The method according to claim 2, further including the steps of:

advertising at each ST node a unique IP network prefix of a local LAN using a routing information Notice (RIN);

polling via the Network Control Station each said ST for its RIN at a periodic rate, the NCS using the RIN to send out Routing Information Summaries (RIS) to all other STs in said DAMA WAN, said RINs being used to keep all said STs aware of all other STs connected to said DAMA WAN together with their directly connected network prefixes.

4. The method according to claim 3, wherein route summarization is used, and wherein route summary information is disseminated via RIN/RIS messages.

5. The method according to claim 2, wherein specific STs are allowed to advertise routing information beyond that of its directly-connected network.

6. The method according to claim 5 wherein an ST running a routing information protocol, and is thus operative as a router, obtains routes-available information about routes available via other routers, said routes available information is forwarded to other STs via said NCS using a Terrestrial Routing Information Notice TRIN, and wherein said NCS uses said routes-available information to generate a Terrestrial Routing Information Summary TRIS for notification to all STs in said DAMA WAN.

7. The method according to claim 2 further including probing for other IP network prefixes reachable via said DAMA WAN using a query/response process.

8. The method according to claim 7, further including the steps of:

initiating a query response upon receipt by any one ST of an IP packet that said ST cannot route directly and wherein said IP packet matches a supernet defined for another one of said STs in said DAMA WAN: thereafter generating at the requesting ST a Route Request (RR) message and sending said RR message to at least all other said STs in said DAMA WAN, said RR message containing an IP destination address from said IP packet that said requesting ST wants to route, in order to cause each said ST search its local routing table to determine if said ST can route the IP packet; if so, sending via said ST a Route Notice (RN) message back to said requesting ST, and causing said requesting ST to enter a route for an appropriate IP subnet, in order to trigger DAMA IP link request to a target ST.

9. The method according to claim 7 further including route summarization whereby a router accumulates a set of routes into a single route advertisement.

10. The method according to claim 1 further including the step of:

updating routes via a designated router only as routes are added and deleted in order to invoke a link state protocol.

11. The method according to claim 10, further including the steps of:

advertising at each ST node a unique IP network prefix of a local LAN using a Routing Information Notice (RIN);

polling via the Network Control Station each said ST for its RIN at a periodic rate, the NCS using the RIN to send out Routing Information Summaries (RIS) to all other STs in said DAMA WAN, said RINs being used to keep all said STs aware of all other STs connected to said DAMA WAN together with their directly connected network prefixes.

12. The method according to claim 11, wherein route summarization is used, and wherein route summary information is disseminated via RN/RIS messages.

13. The method according to claim 10, wherein specific STs are allowed to advertise routing information beyond that of its directly-connected network.

14. The method according to claim 13 wherein an ST running a routing information protocol, and is thus operative as a router, obtains routes-available information about routes available via other routers, said routes available information is forwarded to other STs via said NCS using a Terrestrial Routing Information Notice TRIN, and wherein said NCS uses said routes-available information to generate a Terrestrial Routing Information Summary TRIS for notification to all STs in said DAMA WAN.

15. The method according to claim 10 further including probing for other IP network prefixes reachable via said DAMA WAN using a query/response process.

16. The method according to claim 15, further including the steps of:

initiating a query response upon receipt by any one ST of an IP packet that said ST cannot route directly and wherein said IP packet matches a supernet defined for another one of said STs in said DAMA WAN: thereafter generating at the requesting ST a Route Request (RR) message and sending said RR message to at least all other said STs in said DAMA WAN, said RR message containing an IP destination address from said IP packet that said requesting ST wants to route, in order to cause each said ST search its local routing table to determine if said ST can route the IP packet; if so, sending via said ST a Route Notice (RN) message back to said requesting ST, and causing said requesting ST to enter a route for an appropriate IP subnet, in order to trigger DAMA IP link request to a target ST.

17. The method according to claim 15 further including route summarization whereby a router accumulates a set of routes into a single route advertisement.

* * * * *